(No Model.)

G. W. BLAIR & W. BUTTLER.
APPARATUS FOR COOLING GLASS MOLDS.

No. 325,724. Patented Sept. 8, 1885.

Witnesses.
Harry L. Gill
J. A. Burns

Inventors.
George W. Blair
William Buttler
by their Attorneys
Bakewell & Kerr

UNITED STATES PATENT OFFICE.

GEORGE W. BLAIR AND WILLIAM BUTTLER, OF PITTSBURG, PA.

APPARATUS FOR COOLING GLASS-MOLDS.

SPECIFICATION forming part of Letters Patent No. 325,724, dated September 8, 1885.

Application filed May 29, 1885. (No model.)

*To all whom it may concern:*

Be it known that we, GEORGE W. BLAIR and WILLIAM BUTTLER, of Pittsburg, in the county of Allegheny and State of Pennsylvania, have invented a new and useful Improvement in Apparatus for Cooling Glass-Molds; and we do hereby declare the following to be a full, clear, and exact description thereof, reference being had to the accompanying drawings, forming part of this specification, in which—

Figure 1:
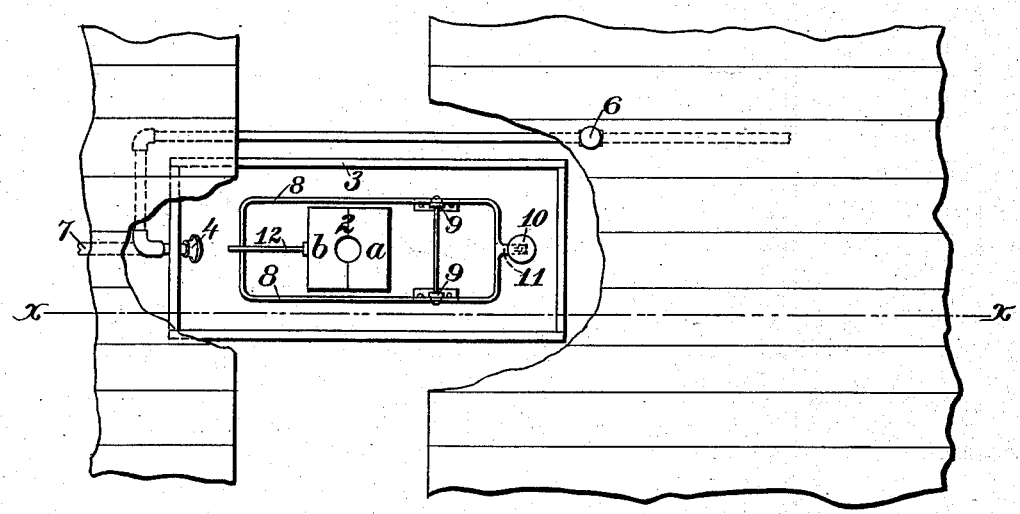
Figure 2:
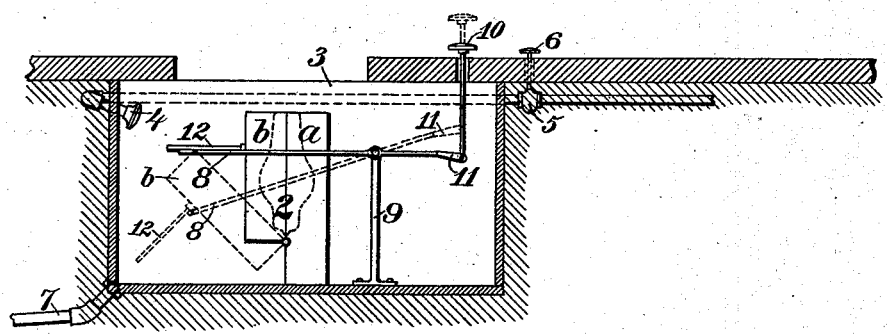

Figure 1 is a plan view of our improved apparatus. Fig. 2 is a vertical longitudinal section on the line $x\ x$ of Fig. 1.

Like letters of reference indicate like parts.

In the manufacture of some articles of glassware it has been usual to blow them in molds whose inner surfaces have been coated with a paste, the purpose of which is to allow the glass to turn in the mold, thus imparting a very smooth and brilliant surface to the product. It is necessary, however, to cool such molds and to wet the paste-surface of the interior after each blowing, and to do this a boy has been employed to dip the mold at intervals in a tub of water. Some of these molds, especially those used for making large articles, are very heavy, and require considerable power to lift. Unless the mold is cooled and the surface of paste on its interior is wet by water, the paste will rapidly burn out and a striated appearance produced on the blown product. The result of wetting the paste is that the adhering film of water will be turned by the hot glass, in the next blowing operation, into a jacket of steam, which prevents intimate contact of the glass with the paste, and preserves the latter from disintegration. This result is not attainable by cooling the mold by the application of water to its exterior, or by the circulation of water through hollow chambers or channels in the mold.

The object of our invention is to provide means for cooling the mold without need of moving it, thereby making the mold a stationary mold and effecting a saving of labor and expense.

Referring, now, to the drawings, 2 represents a two-part glass-mold, which, for the purpose of our invention, is preferably set in a tank or hole, 3, below the level of the glass-house. Opposite the situation of the glass-mold is the orifice of a pipe, 4, which enters the side of the tank and is adapted to discharge a stream of water upon the mold and upon its interior surface. The pipe 4 extends back from its orifice beside the usual position of the glass-blower when at work, and is provided at a convenient place with a valve or cock, 5, the opening of which allows water to pass through the pipe. We have shown the most convenient arrangement of this valve in the drawings. The valve is a common push-valve operated by pushing the stem in a right line toward its seat, as distinguished from screwing it. The pipe 4, being extended under the floor, has the valve-stem 6 extending up through it, and projecting in a convenient place to be opened by the foot of the blower. The operation is then as follows: After blowing each article and removing it from the mold, and while the latter is still open, the workman presses the projecting stem or button 6, thus causing a jet of water to be discharged upon the mold, whereby the body of the mold is cooled, and its interior coating of paste is covered with water. The water escapes from the tank through a discharge-pipe, 7. The purpose of putting the mold in the tank, before referred to, is to prevent the water running over the floor of the glass-house and making it slippery and disagreeable. We therefore do not desire to limit ourselves to its use.

A useful auxiliary to the cooling device before described is shown in the drawings, and consists in means for enabling the mold to be opened and closed by a treadle. The mold is made of two parts, $a$ and $b$, hinged at the bottom, one of the parts, $a$, being fixed and the other free to move pivotally on the hinge, so as to open or close the two parts from or against each other. The sections $a\ b$ are inclosed by a rocking yoke, 8, which is pivoted transversely to vertical standards 9; and a foot-treadle, 10, extends from above the floor to a plate, 11, at the end of the yoke next the fixed section $a$. The other end of the yoke supports an arm or rod, 12, affixed to the section $b$. The mold, being then in the position shown by dotted lines in Fig. 2, is closed by pressing upon the treadle 10, which, tilting the yoke 8 on its pivotal arms 9, raises the rod 12 and pushes the loose section $b$ toward the fixed section $a$ When our improvement is used in connection with this device, the blower may control the operation of the mold with but little trouble and without assistance.

The practical pecuniary advantage arising from the use of our improved apparatus is that it enables glass-manufacturers to produce large articles—such as lamp chimneys and shades—in the paste molds. This has not been practicable heretofore, because of the additional expense of the mold-boy, so that it has been common to use the ordinary blow-over mold, or to blow the articles without a mold. The disadvantage of the former is that the finished articles are somewhat rough and lack the smooth and lustrous surface of hand-blown and paste-mold blown articles. The defect of the hand-blown glassware is that the workman must trust entirely to his eye for accuracy of the dimensions, and as a consequence there is considerable disparity among the articles of one kind blown by a single person, and still more among the products of several men. By the use of the paste mold, which our invention renders feasible, perfect uniformity of product and polish of surface are secured.

We are aware that it is not new to cool glass-molds by causing water to flow through a jacket or chamber inclosing them, and disclaim such arrangement.

We do not desire to limit ourselves to the use of a foot-operated valve, although that is the most convenient; but,

Having thus described our invention, what we claim, and desire to secure by Letters Patent, is—

1. The combination, with a stationary mold for blowing articles of glassware, of a water-pipe having its orifice directed so as to be capable of discharging water upon the mold and upon its inner surface, substantially as and for the purposes described.

2. The combination, with a stationary mold for blowing articles of glassware, of a water-pipe having its orifice directed so as to be capable of discharging water upon the mold and upon its inner surface, and a valve for controlling the discharge of water, substantially as and for the purposes described.

3. The combination, with a stationary mold for blowing articles of glassware, of a water-pipe having its orifice directed so as to be capable of discharging water upon the mold and upon its inner surface, and a valve for controlling the discharge of water, said mold being situate in a receptacle having a discharge-outlet for water, substantially as and for the purposes described.

In testimony whereof we have hereunto set our hands this 23d day of May, A. D. 1885.

GEORGE W. BLAIR.
WILLIAM BUTTLER.

Witnesses:
W. B. CORWIN,
A. ZIMMERMAN.